United States Patent [19]
Bakoledis

[11] Patent Number: 5,702,097
[45] Date of Patent: Dec. 30, 1997

[54] INSERT FEED MECHANISM

[75] Inventor: Andrew G. Bakoledis, Chester, Conn.

[73] Assignee: GBR Systems Corporation, Chester, Conn.

[21] Appl. No.: 702,987

[22] Filed: Aug. 28, 1996

[51] Int. Cl.⁶ .................................................. B65H 39/02
[52] U.S. Cl. .................................... 270/58.06; 270/58.31
[58] Field of Search ........................... 270/58.01, 58.06, 270/58.31, 58.07, 58.08

[56] References Cited

U.S. PATENT DOCUMENTS 2,736,999  3/1956  Rouan et al. ................. 270/58.06
4,522,383  6/1985  Chu et al. ..................... 270/58.08
4,733,856  3/1988  Guntherm, Jr. ............... 270/58.06

Primary Examiner—John T. Kwon
Attorney, Agent, or Firm—Joseph J. Previto

[57] ABSTRACT

An insert feed mechanism a feeder for feeding an insert, a folding assembly, a conveyor for transporting the insert from the feeder to the folding assembly, a sheet feeder for supplying the folding assembly with an envelope sheet. The conveyor directs the insert to strike the envelope sheet at a predetermined place on the envelope sheet where the first fold is to occur. The folding mechanism folds the envelope sheet around the insert to form a mailing envelope.

15 Claims, 1 Drawing Sheet

INSERT FEED MECHANISM

BACKGROUND

The present invention relates to insert feed mechanisms and more particularly to high speed inserter systems for inserting one or more inserts into a sheet of paper before the sheet of paper is folded into a mailing envelope.

In collating and preparing an envelope for mailing it is common for the envelope to be formed from a cut envelope sheet of paper (which may have a message printed thereon) which is then folded into the envelope ready for mailing. Such envelopes usually have inserts (such as promotional materials, bills, a return envelope, etc.) placed within the envelope. It is customary to add these inserts to the envelope sheet before the sheet is folded into a mailing envelope so that the inserts are automatically packaged within the mailing envelope when the sheet is folded around the inserts.

In present high speed inserting mechanisms and paper feeding, it has been difficult to organize, feed and transport either single or multiple inserts efficiently and accurately so that they are properly positioned on the envelope sheet before the envelope sheet is folded around the inserts to form the mailing envelope. Another problem in such high speed paper feeding and folding mechanisms is the fact that it is difficult for current inserters to pick-up inserts from single or multiple intermittent feeding stations. With some current feeders it has been difficult to control each insert as it is transported through the system so that there is no assurance that the insert is presented straight and accurately to the envelope sheet to be folded around it. Current feeders also fail to insure that when multiple inserts are fed the forward or leading edges of the inserts are in alignment with each other so that they strike the sheet of paper at the same time and are folded together at the same place on the envelope sheet. Another problem with current feeders is the fact that the inserts sometimes do not strike the envelope sheet at the place where it is desired that the sheet be folded so that the inserts are not always folded correctly or the inserts sometimes interfere with the folding operation.

OBJECTS

The present invention overcomes these drawbacks and has for one of its objects the provision of an improved insert feed mechanism which is more efficient and accurate than presently existing ones.

Another of object of the present invention is the provision of an improved insert feed mechanism for feeding single sheets or a plurality of sheets onto a cut envelope sheet.

Another object of the present invention is the provision of an improved insert feed mechanism for feeding sheets which will positively control each insert as it is transported through the feeding system.

Another object of the present invention is the provision of an improved insert feed mechanism for feeding sheets which assures that the insert is presented straight and accurately to the envelope sheet to be folded around the insert.

Another object of the present invention is the provision of an improved insert feed mechanism in which the leading edges of a plurality of inserts are in alignment with each other when they strike the envelope sheet.

Another object of the present invention is the provision of an improved insert feed mechanism for feeding sheets in which the leading edge of the insert will strike the envelope sheet at the particular place where the first fold will occur in the envelope sheet.

Another object of the present invention is the provision of an improved insert feed mechanism for feeding sheets in which the insert is not released until the leading edge of the insert is captured by the folding assembly.

Another object of the present invention is the provision of an improved insert feed mechanism for feeding sheets which will permit more and thicker inserts to be folded within an envelope sheet.

Other and further objects will be obvious upon the understanding of the illustrative embodiment about to be described, or which will be indicated in the appended claims, and various advantages not referred to herein, will occur to one skilled in the art upon employment of the invention in practice.

DRAWINGS

A preferred embodiment of the invention has been chosen for purposes of illustration and description and is shown in the accompanying drawings forming a part of the specification, wherein.

DESCRIPTION

Figure 1:
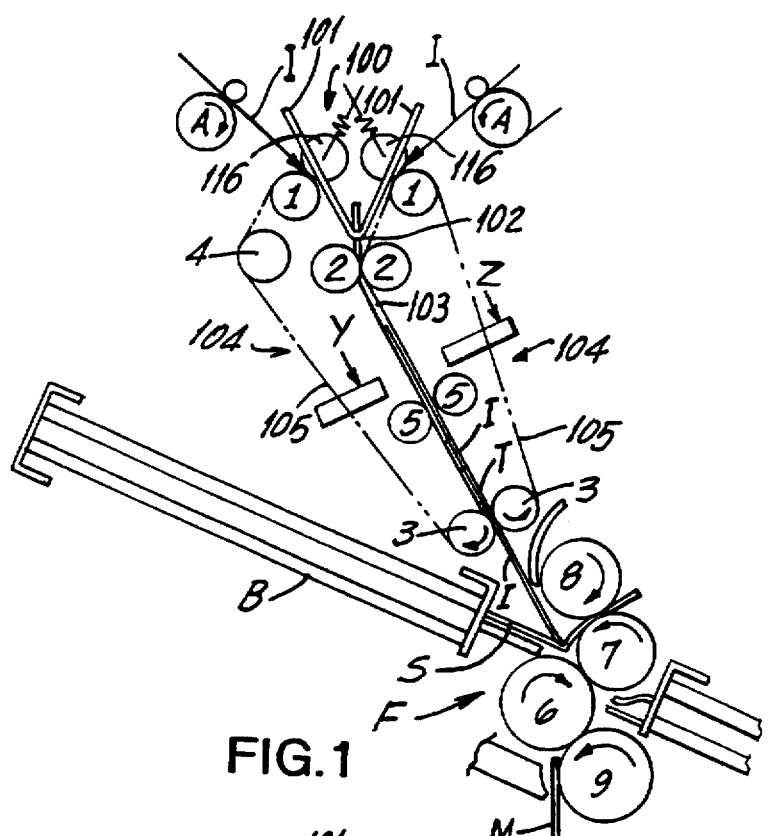
FIG. 1 is a diagrammatic plan view of an inserter mechanism made in accordance with the present invention.

The improved inserter system shown in the drawings comprises a feeder assembly (not shown) for feeding inserts I from a source such as a feeder bin (not shown). The inserts I are fed by the feeder assembly to a feed roller A which receives the inserts I and directs the inserts I to the inserter system of the present invention. While the drawings show a pair of spaced feed rollers A which receive inserts from a plurality of feeder assemblies, it is possible that a single feed roller A may be used with the present invention. Moreover, even when a pair of feed rollers A are present in the inserter mechanism of the present invention, a single feed roller A only may be activated so that a single insert I is fed rather than a plurality of them.

The inserter system of the present invention comprises a separator guide assembly 100 for guiding the inserts I which are received from the feed rollers A. The guide assembly 100 is shown in the drawing as being v-shaped with downwardly converging legs 101 meeting at the apex 102. The guide assembly 100 has a separator blade 103 extending downwardly from the apex 102 and leading towards the folding assembly generally designated as F.

A belt assembly 104 is provided on each side of the separator assembly 100 which is adapted to receive the inserts I form the feed rollers A and direct them to the folding assembly F. A spring-pressed idler roller 116 adjacent each leg 101 and extending through openings in leg 101 makes contact with roller 1 and moves the insert I to the belt assembly 104. Each belt assembly 104 comprises a continuously moving endless feed belt 105 which is moved and controlled by a pinch roller 1, pinch rollers 2 and 5, exit roller 3 and idler roller 4. The feed belt 105 moves along the outer surfaces of the legs 101 and the separator blade 103 of the separator assembly 100. The feed belt 105 moves toward the folding assembly F and is in alignment with the place on the envelope sheet S where the first fold is to occur. The folding assembly F is substantially conventional and comprises the usual folding rollers 6, 7, 8, and 9 which will fold a sheet of paper, in this instance the envelope sheet S, into a mailing envelope and deliver the folded envelope M to a discharge conveyor (not shown). A buckle plate assembly B (also in substantially the usual form) is provided to feed the envelope sheet S to the folding assembly F.

With this construction, each insert I is fed by the feed roller A to the belt assembly 104 and roller 1,2, 5 and 3 so that each insert I is moved between feed belt 105 and the legs 101 and the separator blade 103 of the separator assembly 100. The inserts I are directed by the feed belt 105 to the folding assembly F. The folding assembly F already has had an envelope sheet S fed to it by the buckle plate B and is in place ready to receive the inserts I. The leading edges of the inserts I are in alignment with each other and simultaneously strike the foldable envelope sheet S at the place where the first fold in the envelope sheet S is to be made and the leading edge E of inserts I initiates and directs the envelope sheet S to the first fold place in the folding mechanism E (i.e. between rollers 6–7 in the drawings.) Sensors Y and Z (in substantially the usual form) between rollers 2 and 5 detect whether inserts I have reached that particular position within a specified time limit. If not, the sensors signal the mechanism to shut down. It will be noted that the distance between the exit rollers 3 of the belt assembly 104 is less than the length of an insert I so that belt assembly 104 and pinch roll 3 retains positive control of the inserts I until the folding assembly F grasps the inserts I. Thereafter the folding assembly F operates in a normal manner to fold the envelope sheet S around the inserts I to form a mailing envelope M and deliver the folded mailing envelope M to a discharge conveyor.

Figure 2:
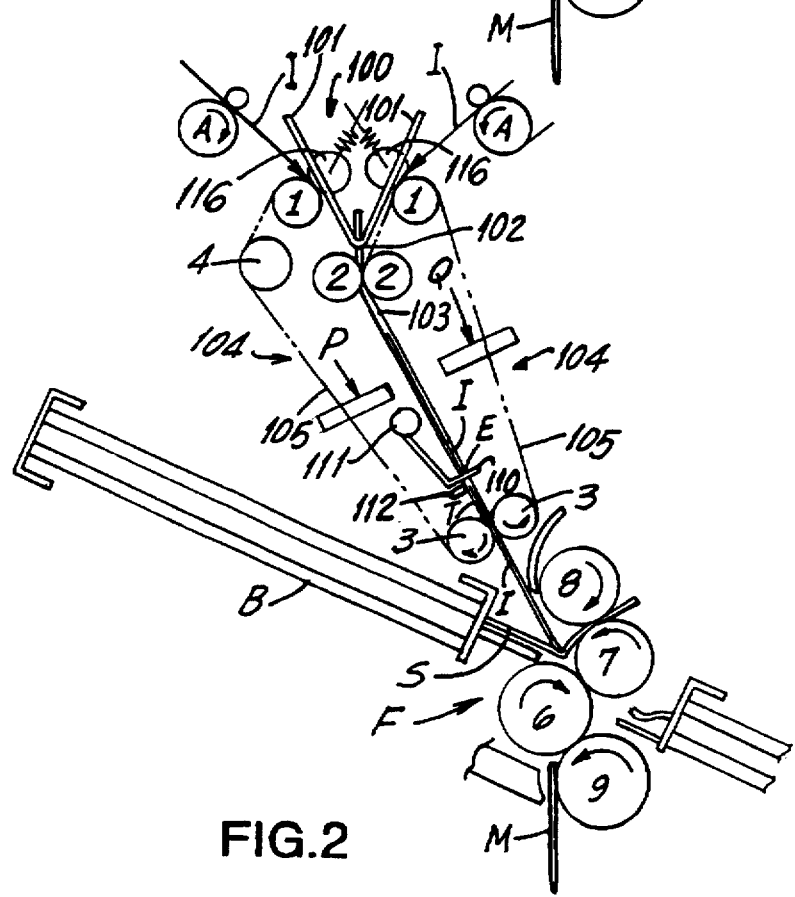
FIG. 2 is a diagrammatic plan view of an inserter mechanism showing a modification of the present invention.

FIG. 2 shows a modification of the present invention. The structure in FIG.2 is similar to the structure shown in FIG. 1 and like parts will be identified by like reference characters. However, in this embodiment, a pivotable stop or door 110 is substituted for the pinch rollers 5 of the belt assembly 104 described in connection with FIG. 1. The door 110 is shown as being pivotally moveable around pivot 111 from a closed position in the path of the inserts I which are moving along feed belts 105 to an open position away from the path of the inserts I. A sensor 112 (which may be in substantially the usual form) may be provided to sense whether inserts I have been released by the door 110 and sensors P and Q (in substantially the usual form) between rollers 2 and door 110 defect whether inserts I are in place so as to signal door 110 to open, as will be explained in greater detail below.

Initially the door 110 is its closed position and the inserts I being fed by the feed belts 105 will strike the door 110 and are stopped there. This blocks the forward movement of the inserts I and at the same time the forward or leading edges E of the inserts I will align with each other. Sensors P and Q detect whether inserts I are in place. If so, sensors P and Q signal the door 110 to open and release inserts to folding assembly F. If inserts are not in place, sensors P and Q signal total shut down of the mechanism. The sensor 112 detects whether inserts I have been released by the door 110. If not, it signals total shutdown of the machine. It will again be noted that the distance between exit rollers 3 of the belt assembly 104 and the folding assembly F is less than that of the length of an insert I so that the feed belts 105 and pinch roller 3 retain positive control of the inserts I until the leading edge E of the inserts I are grasped by the folding assembly F and the envelope sheet S starts folding around the inserts I. In the meantime the door 110 is moved back into its closed position in the path of the inserts I and has blocked another set of inserts I from moving forward toward the folding assembly F. The first inserts I have by now been moved to the folding assembly F so that their trailing edges T are no longer sensed by the sensor 112. As in the embodiment shown in FIG. 1, the leading edges E of inserts I strike the envelope sheet S at the place where the first fold is to occur and the leading edges E of the inserts I initiate and direct the folding of the envelope sheet S so that its first fold is at that place only. The envelope sheet S is then folded around the inserts I to form a mailing envelope M which is then delivered to a discharge conveyor.

It will thus be seen that the present invention provides an insert feed mechanism which is more efficient and accurate than presently existing ones for feeding single sheets or a plurality of sheets onto a cut envelope sheet, which will positively control each insert as it is transported through the feeding system and which assures that the insert is presented straight and accurately to the envelope sheet to be folded around the insert. The present invention also provides an improved feed mechanism in which the leading edges of a plurality of inserts are in alignment with each other when they strike the envelope sheet, in which the leading edge of the insert will strike the envelope sheet at the actual place where the first fold will occur in the envelope sheet, in which the insert is not released until the leading edge of the insert is captured by the folding mechanism and which will permit more and thicker inserts to be folded around an envelope sheet.

As many varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. An insert feed mechanism comprising means for feeding an insert, a folding assembly, conveying means for transporting the insert from the feeding means to the folding assembly, means for supplying the folding assembly with an envelope sheet, said conveying means adapted to direct the insert to strike the envelope sheet at a predetermined place on the envelope sheet where the first fold is to occur, said folding mechanism being adapted to fold the envelope sheet around the insert to form a mailing envelope.

2. A mechanism as set forth in claim 1, wherein the insert initiates the first fold in the envelope sheet at said predetermined place.

3. A mechanism as set forth in claim 2 wherein the movement of the insert is controlled by said conveying means until the folding assembly start folding the envelope sheet around the insert.

4. A mechanism as set forth claim 3 wherein said conveying means does not release the insert until the folding assembly starts folding the envelope sheet around the insert.

5. A mechanism as set forth in claim 4, wherein the distance between the end of said conveying means and said envelope sheet in the folding assembly is less than the length of an insert being fed thereto by the conveying means.

6. A mechanism as set forth in claim 5, wherein a pair of feeding means are provided for feeding a plurality of inserts and wherein separator means are provided between said feeding means.

7. A mechanism as set forth in claim 6, wherein conveying means are provided on each side of said separator means and adapted to move a plurality of inserts from the feeding means to the folding assembly along each side of said separator means.

8. A mechanism as set forth in claim 7, wherein said conveyor means comprises a plurality of rollers around which an endless belt is moved and wherein the endless belt and the rollers move the inserts along the surface of the separator means.

9. A mechanism as set forth in claim 8, wherein said separator means comprises a pair of legs converging to an apex in the direction of the folding assembly and wherein a separator blade extends from the said apex toward the folding assembly.

10. A mechanism as set forth in claim 9, wherein door means are provided which are movable from a position in the path of the inserts to prevent the movement of the inserts to the folding assembly to a position away from the path of the inserts to permit movement of the inserts toward the folding assembly.

11. A mechanism as set forth in claim 10, wherein said door means stop the movement of the inserts and aligns the leading edges of the inserts.

12. A mechanism as set forth in claim 11, wherein means are provided to control the movement of the door means.

13. A mechanism as set forth in claim 12, wherein said control means are sensing means to sense the presence of an insert.

14. A mechanism as set forth in claim 11, wherein sensory means are provided to sense whether the door means has opened.

15. A mechanism as set forth in claim 8, wherein sensing means are provided to sense the presence of an insert.

* * * * *